US009202476B2

(12) United States Patent
Sehlstedt

(10) Patent No.: US 9,202,476 B2
(45) Date of Patent: Dec. 1, 2015

(54) METHOD AND BACKGROUND ESTIMATOR FOR VOICE ACTIVITY DETECTION

(75) Inventor: Martin Sehlstedt, Luleå (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 29 days.

(21) Appl. No.: 13/502,962

(22) PCT Filed: Oct. 18, 2010

(86) PCT No.: PCT/SE2010/051116
§ 371 (c)(1),
(2), (4) Date: Apr. 19, 2012

(87) PCT Pub. No.: WO2011/049514
PCT Pub. Date: Apr. 28, 2011

(65) Prior Publication Data
US 2012/0209604 A1    Aug. 16, 2012

Related U.S. Application Data

(60) Provisional application No. 61/252,858, filed on Oct. 19, 2009, provisional application No. 61/262,583, filed on Nov. 19, 2009, provisional application No. 61/376,752, filed on Aug. 25, 2010.

(51) Int. Cl.
*G10L 15/00* (2013.01)
*G10L 25/78* (2013.01)
(Continued)

(52) U.S. Cl.
CPC ................ *G10L 25/78* (2013.01); *G10L 25/06* (2013.01); *G10L 25/84* (2013.01); *G10L 2025/786* (2013.01)

(58) Field of Classification Search
CPC ...... G10L 25/78; G10L 21/0208; G10L 19/12; G10L 25/93
USPC ......... 704/233, 205, 208, 210, 218, 219, 226, 704/227, 231, 270; 381/94.1, 94.2
See application file for complete search history.

(56) References Cited

U.S. PATENT DOCUMENTS 5,410,632 A * 4/1995 Hong et al. .................... 704/233
5,659,622 A * 8/1997 Ashley .......................... 381/94.1
(Continued)

FOREIGN PATENT DOCUMENTS

EP    1 239 456    9/2002
EP    0 625 774    11/2004
(Continued)

OTHER PUBLICATIONS

International Search Report corresponding to PCT Application No. PCT/SE2010/051116, Date of Mailing: Feb. 11, 2011.
(Continued)

Primary Examiner — Michael Colucci
(74) Attorney, Agent, or Firm — Myers Bigel Sibley & Sajovec, PA

(57) ABSTRACT

The present invention relates to a method and a background estimator in voice activity detector for updating a background noise estimate for an input signal. The input signal for a current frame is received and it is determined whether the current frame of the input signal comprises non-noise. Further, an additional determination is performed whether the current frame of the non-noise input comprises noise by analyzing characteristics at least related to correlation and energy level of the input signal, and background noise estimate is updated if it is determined that the current frame comprises noise.

20 Claims, 7 Drawing Sheets

(51) Int. Cl.
*G10L 25/06* (2013.01)
*G10L 25/84* (2013.01)

(56) References Cited

U.S. PATENT DOCUMENTS

| | | | | |
|---|---|---|---|---|
| 5,727,072 | A * | 3/1998 | Raman | 381/94.2 |
| 5,819,217 | A * | 10/1998 | Raman | 704/233 |
| 6,001,131 | A * | 12/1999 | Raman | 704/226 |
| 6,070,137 | A * | 5/2000 | Bloebaum et al. | 704/227 |
| 6,275,798 | B1 * | 8/2001 | Johansson et al. | 704/233 |
| 6,381,570 | B2 * | 4/2002 | Li et al. | 704/233 |
| 6,415,253 | B1 * | 7/2002 | Johnson | 704/210 |
| 6,427,134 | B1 * | 7/2002 | Garner et al. | 704/233 |
| 6,801,895 | B1 * | 10/2004 | Huang et al. | 704/270 |
| 7,359,856 | B2 * | 4/2008 | Martin et al. | 704/226 |
| 7,620,544 | B2 * | 11/2009 | Woo | 704/226 |
| 7,653,537 | B2 * | 1/2010 | Padhi et al. | 704/218 |
| 2002/0010580 | A1 * | 1/2002 | Li et al. | 704/233 |
| 2002/0165711 | A1 * | 11/2002 | Boland | 704/231 |
| 2002/0165718 | A1 * | 11/2002 | Graumann et al. | 704/270 |
| 2002/0188442 | A1 * | 12/2002 | Gass et al. | 704/208 |
| 2002/0198708 | A1 * | 12/2002 | Zak et al. | 704/233 |
| 2004/0002856 | A1 * | 1/2004 | Bhaskar et al. | 704/219 |
| 2004/0030544 | A1 * | 2/2004 | Ramabadran | 704/205 |
| 2005/0143989 | A1 * | 6/2005 | Jelinek | 704/226 |
| 2007/0050189 | A1 * | 3/2007 | Cruz-Zeno et al. | 704/226 |
| 2009/0271190 | A1 * | 10/2009 | Niemisto et al. | 704/233 |

FOREIGN PATENT DOCUMENTS

| | | |
|---|---|---|
| JP | A S63-237100 | 10/1988 |
| JP | 2005215204 A | 8/2005 |
| JP | 2007179073 A | 7/2007 |
| WO | WO 00/31720 | 6/2000 |
| WO | WO 2004/012097 | 2/2004 |
| WO | WO 2008/143569 | 11/2008 |
| WO | WO 2009000073 A1 | 12/2008 |
| WO | WO 2009078093 A1 | 6/2009 |

OTHER PUBLICATIONS

ETSI TS 126 094 v7.0.0, Digital cellular telecommunications system (Phase 2+); Universal Mobile Telecommunications System (UMTS); Mandatory speech codec speech processing functions; Adaptive Multi-Rate (AMR) speech codec; Voice Activity Detector (VAD); (3GPP TS 26.094 version 7,0.0 Release 7), Jun. 2007, 26 pages.

Written Opinion of the International Searching Authority corresponding to PCT Application No. PCT/SE2010/051116, Date of Mailing: Feb. 11, 2011.

Extended European Search Report corresponding to European Application No. 10825285.9-1910, Date of Mailing: Oct. 4, 2013.

Japanese Office Action Corresponding to Japanese Patent Application No. 2012-535162; Date Mailed: Apr. 22, 2014; Foreign Text, 3 pages, English Translation Thereof, 2 Pages.

* cited by examiner

METHOD AND BACKGROUND ESTIMATOR FOR VOICE ACTIVITY DETECTION

CROSS-REFERENCE TO RELATED APPLICATIONS

This application is a 35 U.S.C. §371 national stage application of PCT International Application No. PCT/SE2010/051116, filed on 18 Oct. 2010, which claims the benefit of priority of U.S. Provisional Application No. 61/252,858, filed 19 Oct. 2009, U.S. Provisional Application No. 61/262,583, filed 19 Nov. 2009, and U.S. Provisional Application No. 61/376,752, filed 25 Aug. 2010. The above-referenced PCT International Application was published in the English language as International Publication No. WO 2011/049514 on 28 Apr. 2011. The disclosures of the above-referenced applications are hereby incorporated herein in their entireties by reference.

TECHNICAL FIELD

The embodiments of the present invention relates to a method and a background estimator of a voice activity detector.

BACKGROUND

Background noise estimates are used as a characterization of the background noise and is of use in applications such as: Noise suppression, Voice Activity Detectors, SNR (Signal-to-Noise Ratio) estimates.

Among the more important properties of the background noise estimate is that it should be able to track changes in the input noise characteristics and it should also be able to handle step changes such as sudden changes in the noise characteristics and/or level while still avoiding using non-noise segments to update the background noise estimate.

In speech coding systems used for conversational speech it is common to use discontinuous transmission (DTX) to increase the efficiency of the encoding. It is also possible to use variable bit rate (VBR) encoding to reduce the bit rate. The reason is that conversational speech contains large amounts of pauses embedded in the speech, e.g. while one person is talking the other one is listening. So with discontinuous transmission (DTX) the speech encoder is only active about 50 percent of the time on average and the rest is encoded using comfort noise. One example that uses DTX is the AMR (Adaptive Multi Rate) Narrowband. For high quality DTX operation, i.e. without degraded speech quality, it is important to detect the periods of speech in the input signal this is done by the Voice Activity Detector (VAD). The DTX logic uses the VAD results to decide how/when to switch between speech and comfort noise.

FIG. 1 shows an overview block diagram of a generalized VAD 180, which takes the input signal 100, divided into data frames, 5-30 ms depending on the implementation, as input and produces VAD decisions as output 160. I.e. a VAD decision 160 is a decision for each frame whether the frame contains speech or noise which is also referred to as VAD_flag.

The generic VAD 180 comprises a feature extractor 120 which extracts the main feature used for VAD decisions from the input signal, one such example is subband energy used as a frequency representation of each frame of the input signal. For the decision making a background estimator 130 provides subband energy estimates of the background signal (estimated over earlier input frames). An operation controller 110 collects characteristics of the input signal, such as long term noise level, long term speech level for long term SNR calculation and long term noise level variation as input signals to a primary voice detector.

A preliminary decision, "vad_prim" 150, is made by a primary voice activity detector 140 and is basically just a comparison of the features for the current frame and background features (estimated from previous input frames), where a difference larger than a threshold causes an active primary decision. A hangover addition block 170 is used to extend the primary decision based on past primary decisions to form the final decision, "vad_flag" 160. The reason for using hangover is mainly to reduce/remove the risk of mid speech and backend clipping of speech bursts. However, the hangover can also be used to avoid clipping in music passages. The operation controller 110 may adjust the threshold(s) for the primary voice activity detector 140 and the length of the hangover addition 170 according to the characteristics of the input signal.

The background estimation can be done by two basically different principles, either by using the primary decision i.e. with decision (or decision metric) feedback indicated by dash-doted line in FIG. 1 or by using some other characteristics of the input signal i.e. without decision feedback. It is also possible to use combinations of the two strategies.

There are a number of different features that can be used but one feature utilized in VADs is the frequency characteristics of the input signal. Calculating the energy in frequency subbands for the input signal is one popular way of representing the input frequency characteristics. In this way one of the background noise features is the vector with the energy values for each subband. These are values that characterize the background noise in the input signal in the frequency domain.

To achieve tracking the actual noise estimate update can be made in at least three different ways. The first way is to use an AR-process (Autoregressive process) per frequency bin to handle the update. Basically for this type of update the step size of the update is proportional to the observed difference between current input and the current background estimate. The second way is to use multiplicative scaling of current estimate with the restriction that the estimate never is bigger than the current input or smaller than a minimum value. This means that the estimate is increased for each frame until it is higher than the current input. In that situation the current input is used as estimate. The third way is to use minimum technique where the estimate is the minimum value during a sliding time window of prior frames. This basically gives a minimum estimate which is scaled, using a compensation factor, to get and approximate average estimate for stationary noise. Sliding time window of prior frames implies that one creates a buffer with variables of interest (frame energy or sub-band energies) for a specified number of prior frames. As new frames arrive the buffer is updated by removing the oldest values from the buffer and inserting the newest.

While the minimum estimation technique has low complexity the resulting estimate may not be accurate enough for varying background noise. The motivation is that a long sliding time window may at times result in a too low estimate while a short sliding time window may result in an estimate that is too large. With the sliding time window it is also not clear how the background estimator will work for music type input.

Using the multiplicative scaling of the current estimate with the restriction that the estimate can not be bigger than the current value shows better tracking than the pure minimum estimation technique but there is still a problem in tracking quick increases in a varying background. Basically the tracking works until the increase rate exceeds the rate limited by the multiplicative scaling.

Using AR-processes for background update has the potential to be efficient at tracking the background noise level. However, a decision error where the updating of the background estimate is made with non-noise data can result in a poor estimate of the background. Especially for VAD solutions relying on decision feedback an inaccurate background estimate can lead to even more decision errors.

So to avoid updating the background estimate with non-noise data there are usually many restrictions on when to update the background estimate, at least upwards. While the many restrictions will reduce the risk of using non-noise data for update the restrictions will at the same time reduce the ability of the estimator to track varying background noise, especially in the case of non-stationary background noises. By allowing the estimates to always be updated downwards the effect of some error decisions can be reduced. A drawback of always updating downwards is that for non-stationary noise it will in the end lead to too low estimates. The motivation here is similar to the minimum estimation where in this case there is no length defined for the sliding time window.

There is also the possibility to end up in background noise update deadlock. That is the background logic has ended up in a state where it is not allowed to change the background noise even though the input currently is noise only input. This can happen if there is a sudden change in the noise characteristics or noise level so that the input is no longer recognized as noise. For this reason there is usually a recovery algorithm. While this usually works for stationary noise it may not always work for babble noise (which by nature is relatively close to speech in characteristics).

While energy based pause detectors can work well in good SNR conditions they have limited functionality in low SNR conditions.

SUMMARY

It is therefore an object of the embodiments of the present invention to provide a solution for VAD with an improved performance in low SNR conditions.

This is achieved by performing an additional determination whether a current frame comprises noise. In one embodiment this additional determination is performed on only the frames which are considered to comprise non-noise.

According to a first aspect of embodiments of the present invention a method for updating a background noise estimate for an input signal in a background estimator in a VAD is provided. In the method, the input signal for a current frame is received and it is determined whether the current frame of the input signal comprises non-noise. Further, an additional determination is performed whether the current frame of the non-noise input comprises noise by analyzing characteristics at least related to correlation and energy level of the input signal, and background noise estimate is updated if it is determined that the current frame comprises noise.

According to a second aspect of embodiments of the present invention a background estimator in a VAD for updating a background noise estimate for an input signal is provided. The background estimator comprises an input section configured to receive the input signal for a current frame. The background estimator further comprises a processor configured to determine whether the current frame of the input signal comprises non-noise, to perform an additional determination whether the current frame of the non-noise input comprises noise by analyzing characteristics at least related to correlation and energy level of the input signal, and to update background noise estimate if it is determined that the current frame comprises noise.

By using the embodiment of the present invention a better noise tracking for background noise estimates especially for non-stationary noise is achieved. With the improved noise tracking there is an improvement in VAD functionality, seen as a reduction in false speech frames reported in non-stationary noise. Further, an improved deadlock recovery of background noise estimation for stationary noise types may be provided. From a system point of view the reduction in excessive activity would result in better capacity.

Hence a method and a background estimator of a voice activity detector of e.g. an encoder of a transmitter in user equipments are provided which are configured to implement the solution of the embodiments of the present invention.

DETAILED DESCRIPTION

Figure 1:
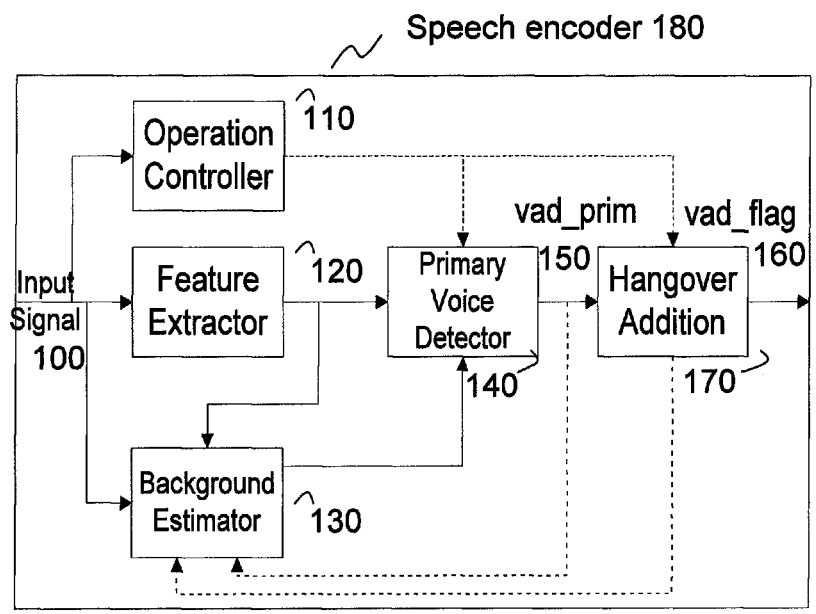
FIG. 1 illustrates a generic Voice Activity Detector (VAD) with background estimation according to prior art.

The embodiments of the present invention will be described more fully hereinafter with reference to the accompanying drawings, in which preferred embodiments of the invention are shown. The embodiments may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like reference signs refer to like elements.

Moreover, those skilled in the art will appreciate that the means and functions explained herein below may be implemented using software functioning in conjunction with a programmed microprocessor or general purpose computer, and/or using an application specific integrated circuit (ASIC). It will also be appreciated that while the current embodiments are primarily described in the form of methods and devices, the embodiments may also be embodied in a computer program product as well as a system comprising a computer processor and a memory coupled to the processor, wherein the memory is encoded with one or more programs that may perform the functions disclosed herein.

Figure 2:
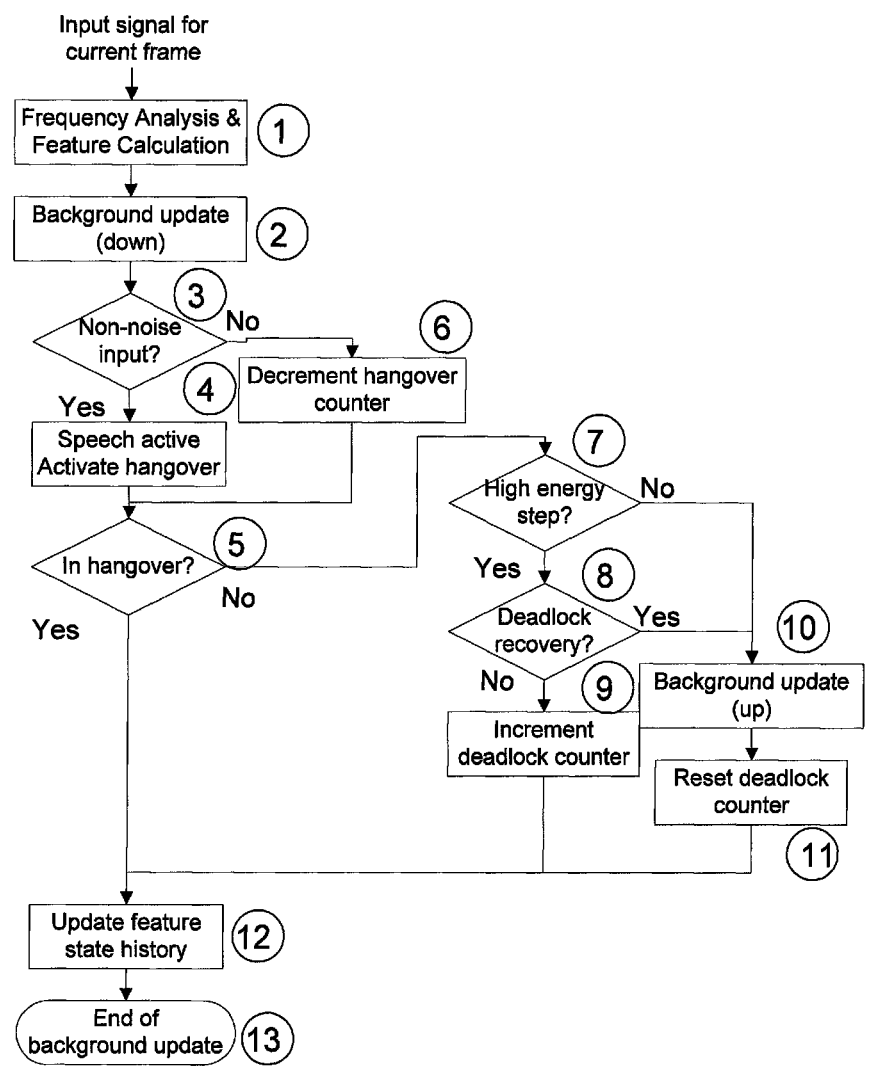
FIG. 2 is a flowchart illustrating a background update procedure for a background noise estimator to be implemented in a transmitter according to prior art.

In order to describe the embodiments of the present invention, the AR (Autoregressive)-process is used for background noise estimation where downwards adjustments of the noise estimates are always allowed. FIG. 2 shows a basic flowchart of the decision logic for such a background estimator according to prior art.

1. The update process of the background estimate starts with a frequency analysis to derive subband levels from the current input frame. Also other features used for the decision logic are calculated in this step, such as examples of features related to the noise estimation, total energy Etot, correlation, including pitch and voicing parameters. A vad_flag, i.e. the decision whether voice is detected by the voice activity detector, is also calculated in this step.

2. In this step, calculation of a potentially new noise estimate, tmpN is performed. This estimate is only based on the current input frames and the background noise estimate from the last frame. Already at this point the current noise estimate can be reduced if the currently estimated background estimate is higher than the potentially new noise estimate. In the pseudo code below that corresponds to that tmpN[i] is lower than bckr[i].

3. Features related to noise estimation used in the noise update logic are then evaluated and if non-noise input is detected the input is most likely an active speech signal.

4. For active speech signals a hangover counter is activated if needed. Note that it is common also for background update procedures to use a hangover period and this is done to avoid using large noise like segments of a speech signal for background estimation.

5. If the hangover counter is not zero, the background estimation is still in hangover and there will not be any background noise update during this frame. If the hangover period is over, the hangover counter is zero. It may be possible to increase the noise estimate.

6. If non-noise is not detected in block 3 the speech burst has ended and the hangover counter is decremented if there is any remaining hangover.

7. When the hangover period is over, the hangover counter is zero. A final test to identify high energy step, i.e. if an input energy is much larger than current noise estimate, is made to ensure that high energy steps are not used for background updates.

8.-11. To avoid that a high energy step causes the background estimation to deadlock the recovery logic allows for an update after a certain delay, i.e. a number of deadlocked frames.

12.-13. The final steps before ending the noise update procedure is to update feature state history for usage in an evaluation of the next frame.

In accordance with embodiments of the present invention an additional determination is performed whether the current frame of the non-noise input comprises noise. This is performed by analyzing characteristics at least related to correlation and energy level of the input signal, and the background noise estimate is updated if it is determined that the current frame comprises noise.

Figure 3:
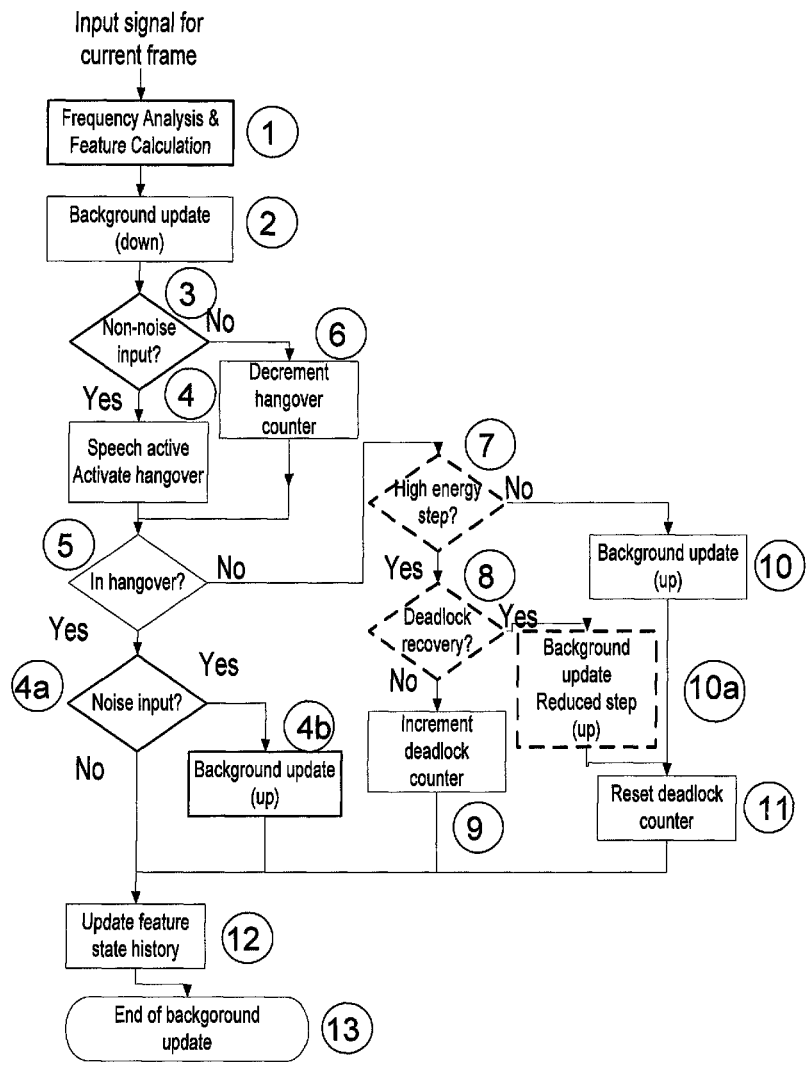
FIG. 3 is a flowchart illustrating a background update procedure for a background noise estimator to be implemented in a transmitter according to embodiments of the present invention.

Turning now to the flowchart of FIG. 3, showing an embodiment of the present invention. Compared to the flowchart of FIG. 2, the flowchart of FIG. 3 comprises additional or modified steps denoted "non-noise input?" denoted 3, "Noise input?" denoted 4a, "Background update (up)" denoted 4b, "High energy step" denoted 7, and "deadlock recovery?" denoted 8 and Background update reduced step (up) denoted 10a. The other blocks have the same functionality as the corresponding blocks in FIG. 2.

With the logic of block 3 of FIG. 2, it could happen that certain noise types were mistaken for music and would therefore prevent noise estimate to increase. Using a new feature implemented in block 3 of FIG. 3, where the time since the last frame with correlation is taken into account combined with parts of the logic of the block 3 of FIG. 2, it is possible to disable the feature blocking noise updates if the input is noise like, i.e. if the input showed no signs of correlation for a sufficient long time according to the embodiments of the invention.

In the "noise input?" block denoted 4a as an additional step, the additional determination is performed whether the current frame of the non-noise input comprises noise according to embodiments of the present invention. The improved decision logic combines existing and new features to improve the non-noise detection in block 3 and adds the second noise input detection step in block 4a which also allows for an additional background update (see step 4b) although it was determined in block 5 that one still is in background noise update hangover. Thus, the additional noise input detection step in block 4a introduces an extra check of frames which are identified as potential voice frames in the "non-noise input" if they really are voice. If it is now determined that the frames are noise, then an increase in the noise estimate is allowed to be used to update the background in block 4b. Basically this allows better tracking of noise estimates close to speech bursts and some times even within speech bursts.

The logic of the "Background update (up)" block denoted 4b allows an increase of the noise estimate but with a smaller step size compared to the "normal" noise increase used in the block of FIG. 2.

With the introduction of the new possibility to update noise (4a and 4b) although it is determined in block 5 that the hangover period for background noise update is still ongoing. It is possible to sharpen the requirements for normal (i.e. when it is determined in block 5 that sufficient time has passed since non-noise input was present) noise update without increasing the risk of ending up in noise estimate deadlock in the "high energy step?" block denoted 7. Noise estimate deadlock implies that it is not allowed to further increase the noise estimate. It is desirable to sharpen these requirements as it prevents some unwanted regular noise updates which e.g. causes clipping in music.

The modification of block 8 and the addition of block 10a improves the performance compared to the prior art solution of FIG. 2, as the deadlock recovery of FIG. 2 was too aggressive. The modifications in blocks "Deadlock recovery?" 8 and "background update reduced step (up)" 10a results in reduced the step size of noise estimate increase to avoid deadlock.

Different features have different reliability depending on the context in which they appear. For speech, music and tone input, correlation is an important feature as speech and music consist of at least segments of input where correlation can be detected. Also the usefulness of frame energy as a low complex feature for noise detection should not be underestimated when combined with other features.

For the improved control logic according to embodiments of the present invention, the following features are defined:

$E_{f\_low\_LP}$ is a smoothed minimum energy tracker that is updated every frame. This is mainly used as a basis for other features.

$E_t - E_{f\_low\_LP}$ is the difference in energy for current frame compared to smoothed minimum energy tracker.

$N_{tot} - E_{f\_low\_LP}$ is the difference in energy for current noise estimate compared to smoothed minimum energy tracker.

$N_{bg}$ is a counter for the number of consecutive possible background frames, based on $E_{f\_low\_LP}$ and the total energy $E_t$. Note that this feature will not create a deadlock for stationary noise.

$N_{corr}$ is a correlation event counter which counts the number of consecutive frames since the last frame that indicated correlation.

$SNR_{sum}$ is a decision metric from a subband SNR VAD. In the improved background noise update logic this is used as a weighted spectral difference feature.

The correlation event counter $N_{corr}$ is used in an improved non-noise detector as it is only in long speech/music pauses that the feature $N_{corr}$ will reach high values. This can be used to decrease the sensitivity of the non-noise detector when there has been a long pause since the last correlation event. This will allow the background noise estimator to better track the noise level in the case of noise only input.

It is still important to avoid that the background noise tracking follows high steps in the input energy directly. Therefore the feature $E_t-E_{f\_low\_LP}$ can be used to detect when such energy steps occur and temporary block noise update from tracking the input. Note that for a step to a new level the feature $E_t-E_{f\_low\_LP}$ will eventually recover since $E_{f\_low\_LP}$ only is based on the input energy and will adapt to the new level after a certain delay.

The additional noise detector step according to the embodiments can be seen as a combination of secondary noise update and alternative deadlock recovery. Two additional conditions are allowed for background update outside the normal update procedure. The first uses the features $N_{corr}$, $E_t-E_{f\_low\_LP}$, $N_{tot}-E_{f\_low\_LP}$, and $N_{bg}$. Where $N_{corr}$ ensures that a number of frames have been correlation free, $E_t-E_{f\_low\_LP}$ ensures that the current energy is close to the current estimated noise level, $N_{tot}-E_{f\_low\_LP}$ ensures that the two noise estimates are close (this is needed since $E_{f\_low\_LP}$ is allowed to track the input energy also in music), and $N_{bg}$ that the input level has been reasonably low (close to $E_{f\_low\_LP}$) for a number of frames. The second uses the features $N_{corr}$ and $SNR_{sum}$. Where $N_{corr}$ as before ensures a number of correlation free frames and $SNR_{sum}$ is used as a weighted spectral difference measure to decide when the input is noise like. Any of these two conditions can allow background noise to be updated.

There are also improvements made in the high energy step detector and the deadlock recovery. With the addition of the specific noise detection step it is possible to increase the sensitivity of the high energy step detector and the step size for the original deadlock recovery can be reduced.

Calculation of some of the above mentioned features are further defined below:

The $E_{f\_low\_LP}$ is as mentioned above a smoothed function of a minimum estimate of the frame energy that is slowly increased until a new minimum is found. $E_{f\_low}$ is an unsmoothed value which is increased with a small value $\delta_{f\_low}$ if the current frame energy $E_t$ is lower than the modified $E_{f\_low}$. Then $E_{f\_low}$ is set to $E_t$. The new value for $E_{f\_low}$ is then used to update the smoothed value through using an AR-process: $E_{f\_low\_LP}=(1-\alpha)E_{f\_low\_LP}+\alpha E_{f\_low}$. Note that after smoothing $E_{f\_low\_LP}$ is no longer a strict minimum estimate.

$N_{bg}$ is as stated above a counter for the number of consecutive suspected background frames, based on $E_{f\_low\_LP}$ and the total energy $E_t$ through the feature $E_t-E_{f\_low\_LP}$. If $N_{bg}$ is zero or larger and $E_t$ is sufficiently larger than $E_{f\_low\_LP}$ a speech burst is assumed to have been started or is ongoing, then set $N_{bg}=-1$. If $N_{bg}=-1$ and $E_t$ is not sufficiently larger than $E_{f\_low\_LP}$ is assumed that a speech pause has started, set $N_{bg}=0$. If at this point $N_{bg}$ is zero or larger then increment $N_{bg}$ with 1.

$N_{corr}$ is the correlation event counter which counts the number of consecutive frames since the latest correlation event. If correlation is detected in the current frame, then set $N_{corr}=0$ otherwise increment the counter $N_{corr}=N_{corr}+1$.

The embodiments of the invention improve the decision logic for blocking the normal noise update process but also adds an alternative for updating the background estimate. This is done so that the background noise estimator achieves better tracking of non-stationary input noise and to avoid deadlock for the stationary noise types such as pink and white noise and still maintain/improve the ability of not tracking music or front ends of speech bursts.

An embodiment of the present invention will now be described in conjunction with the pseudo code below. A G.718 codec (ITU-T recommendation embedded scalable speech and audio codec) is used as a basis for this description, but it should be noted that the embodiments are applicable to other codecs.

TABLE 1

| Notation in the pseudo code | Description of parameter |
|---|---|
| non_sta | Non-stationarity |
| non_sta2 | Complementary non-stationarity |
| th_sta | Limit for non stationarity 0.85 |
| tmp_pc | Pitch stability counter |
| 0.5 (cor[0] + cor[1]) + corr_shift | Voicing metric based on correlation |
| cor_max | Voicing threshold (0.85 for WB) |
| epsP[2]/epsP[16] | LP residual ratio |
| th_eps | Residual ratio threshold (1.6) |
| Harm | Detects tonal nature of music |
| noise_char | Relation in energy between HF and LP, requires energy in HF and LF |
| st_act_pred | Predictor of activity |
| aEn | Hangover counter for background noise update |
| first_noise_updt | Noise deadlock update counter |
| tmpN[ ] | Pre-calculated noise level estimate for current frame, used for update |
| Bckr[ ] | Noise estimate per critical band |
| totalNoise | Noise level estimate for current frame (in dB) |
| Etot | Total energy of Input frame (in dB) |

First in block 1 a frequency analysis and feature calculation is performed as explained in conjunction with block 1 of FIG. 2. The noise level estimate may be updated as in block 2 of FIG. 2. The determination whether the input frames comprises non-noise input is performed in block 3.

In order to allow the Noise Estimation to work also for pink and white noise the input to the VAD is needed to be modified. This is done in block 3 according to the embodiments by introducing a counter for counting the number of frames since the last harmonic or correlation event occurred (st_harm_cor_cnt or $N_{corr}$). This is based on the same features used for the correlation criterion as in the non-noise test of FIG. 2. The difference is that the counter is added. An example of how the counter can be implemented is exemplified in the pseudo code below.

```
if ( (harm>0) || (0.5 (cor[0]+cor[1]) + corr_shift > cor_max) )
    st_harm_cor_cnt =0;
else
    st_harm_cor_cnt +=1;
```

Also the feature of detecting sudden increases in input energy is introduced in block 3 based on (Etot_l_lp or $E_{f\_low\_LP}$) which later is used in the feature (Etot−Etot_l_lp or $E_t-E_{f\_low\_LP}$).

```
         Etot_l += 0.05;
         if (Etot < Etot_l)
            Etot_l = Etot;
         Etot_l_lp = 0.01 Etot_l + 0.99 Etot_l_lp;
```

Etot_l is increased every frame but can never be higher than the current input energy. This metric is further low pass filtered to form Etot_l_lp. The condition (Etot−Etot_l_lp>10) prevents normal noise update from being used on frames with high energy compared to the current smoothed minimum estimate.

Using this metric the condition for preventing background is modified in this embodiment to:

```
If ( ((st_harm_cor_cnt < 80) && ( (non_sta > th_sta) ||
                          (tmp_pc < TH_PC) ||
                          (noise_char > 0)
        ) ||
        ( (Etot − Etot_l_lp) >10) ||
        (0.5 (cor[0] + cor[1]) + corr_shift > cor_max) ||
        (epsP[2]/ epsP[16] > th_eps) ||
        (harm > 0) ||
        ((st_act_pred > 0.8) && (non_sta2 > th_sta))
     )
  {
    aEn = aEn + 2;                    /* Non-noise input?=yes */
  }
  else
  {
    aEn = aEn − 1;                    /* Non-noise input?=no */
  }
```

This embodiment prevents non_sta, tmp_pc, and noise_char features to stop a background update if there has not been a harmonic or correlation event within the last 80 frames.

With the above mentioned modifications according to the embodiments of the invention corresponding to block 3, the updated prevention logic, an alternative to slow noise update is needed to prevent sudden increases in the background noise to cause the noise estimator to end up in a deadlock. This also requires another added feature in the form of a background frame counter for a sensitive energy based pause detector (bg_cnt) (bg_cnt==−1 ->possible speech burst, bg_cnt==0 ->start of background, bg_cnt==n ->n'th frame since start of background)

```
         If ( (bg_cnt >= 0) && ((Etot − Etot_l_lp) >5) )
            bg_cnt = −1;    //startof speech burst?
         else if ( (bg_cnt == −1) && ((Etot − Etot_l_lp) <5)
            bg_cnt = 0      //start of pause
         If (bg_cnt >=0)
            bg_cnt +=1;     //increment counter of pause frames
```

Here bg_cnt forms a combined energy based pause detector and pause burst length counter that ensures the current frame energy is not far from its long term estimate. This is used to ensure that non-speech frames are not used for a background update without the risk of ending up in a deadlock. The final conditions for updating the background are modified to when it is determined that it is not non-noise in block 3:

```
If (aEn == 0)
{
  if ( ((Etot − totalNoise) < 15) || (first_noise_updt==0))
  {
    first_noise_updt = 1;
    for (i=0; i> NB_BANDS ; i++)
    {
      bckr[i] = tmpN[i];
    }
  }
  else if ( (st_harm_cor_cnt > 20) && ((Etot-totalNoise) < 25) ) ||
          (first_noise_updt > 50)
          )
  {
    first_noise_updt = 1;
    for (i=0; i> NB_BANDS ; i++)
    {
      bckr[i] = bckr[i] + 0.1 * (tmpN[i] − bckr[i]);
    }
  }
  else
  {
    first_noise_updt +=1;
  }
}
else if ( ( (st_harm_cor_cnt > 20) &&
          ((totalNoise − Etot_l_lp) > −5) &&
          ((Etot − Etot_l_lp) < 8)) &&
          (bg_cnt > 10)           ) ||
          ((st_harm_cor_cnt > 80) && (snr_sum < 12) ) ||
          ( (prim_act<0.9f) && (
              ( (*st_harm_cor_cnt > 3 ) &&
                ((Etot_h − Etot) > 25) &&
                ((Etot − Etot_l_lp) < 3.0f*Etot_v_h )) ||
              ( (*st_harm_cor_cnt > 0 ) &&
                ((Etot − Etot_l_lp) < 1.0f*Etot_v_h))))   /* prim_act
is the primary activity of the VAD */
          )
{
  first_noise_updt_he = 1;
  for (i=0; i> NB_BANDS ; i++)
  {
    bckr[i] = bckr[i] + 0.5 * (tmpN[i] − bckr[i]);
  }
}
```

In the above pseudo code an initial test (aEn==0) is the "in hangover?" test corresponding to block 5 in FIG. 3. The first modification block of the pseudo code above makes the normal background update procedure more sensitive to energy increases as it only allows 15 dB difference between Etot and totalNoise (compared to 25 dB before), also note that the deadlock recovery is moved to the second modification block, with update using a reduced stepsize which corresponds to blocks 8 and 10*a* of FIG. 3. This pseudo code corresponds partly to the functionality of the modified blocks 7 and the blocks 11 and 10 in FIG. 3.

The second modification block of the pseudo code above allows for reduced step size update if there has not been correlation in 20 frames and the difference between Etot and totalNoise is less 25 dB. Also the deadlock recovery is only allowed to use reduced step size update. This pseudo code corresponds partly to the functionality of blocks 8, 11 and 10*a* of the blocks in FIG. 3. The pseudo code block ends with the increment of the deadlock recovery counter if none of the above noise adjustments have been possible, corresponding to block 9 in FIG. 3.

The third modification block of the pseudo code above contains the additional noise detection test in block 4*a* and an added background noise update possibility in block 4*b*. Note that this pseudo code block is executed when normal noise estimate is prohibited due to hangover. There are two alternatives, and both alternatives depend on the correlation counter harm_cor_cnt. In the first alternative, more than 20 correlation free frames are required in addition to low energy differences using the new metrics totalNoise-Etot_1_lp and Etot-Etot_1_lp combined with the low complex pause length counter bg_cnt. In the second alternative, more than 80 correlation free frames are required in addition to a low snr_sum. Note that snr_sum is the decision metric used in the VAD and in this case it is used as a spectral difference between the current frame and the current background noise estimate. With snr_sum as a spectral difference measure no weight is put on a decrease in energy for a subband compared to the background estimate. For this spectral difference only an increase of subband energy has any weight.

For non-noise test in block 3 of FIG. 3 the feature, $E_t - E_{f\_low\_LP}$ has been compared to a fixed threshold in the above described embodiment. This is also valid for the creation of $N_{bg}$ wherein the feature $E_t - E_{f\_low\_LP}$ is compared to a fixed threshold. An alternative for the above described embodiment, is to use hysteresis in the decision threshold for $E_t - E_{f\_low\_LP}$, that is different fixed thresholds are used depending on if one is looking for a speech burst ($N_{bg} \geq 0$) or a speech pause ($N_{bg} = -1$).

For the noise test in block 4a of FIG. 3 the features $E_t - E_{f\_low\_LP}$ and $N_{tot} - E_{f\_low\_LP}$ are compared with fixed thresholds and also the feature $SNR_{sum}$ is compared with a fixed threshold in the above described embodiment.

According to a further embodiment, for non-noise test in block 3 of FIG. 3 the feature $E_t - E_{f\_low\_LP}$ is compared to an adaptive threshold. For the creation of $N_{bg}$ the feature $E_t - E_{f\_low\_LP}$ is also compared to an adaptive threshold. An alternative, would be to use hysteresis in the decision threshold for $E_t - E_{f\_low\_LP}$, that is different adaptive thresholds are used depending on if one is looking for a speech burst ($N_{bg} \geq 0$) or a speech pause ($N_{bg} = -1$).

For the noise test the features $E_t - E_{f\_low\_LP}$ and $N_{tot} - E_{f\_low\_LP}$ are compared with adaptive thresholds. Also the feature $SNR_{sum}$ is compared with an adaptive threshold.

All the above threshold adaptations can be based on input features such as Input energy variation, estimated SNR, background level, or combinations thereof.

According to a further embodiment, the additional noise test function in block 4a is applied to all frames, not just the frames for non-noise or hangover.

Figure 4:
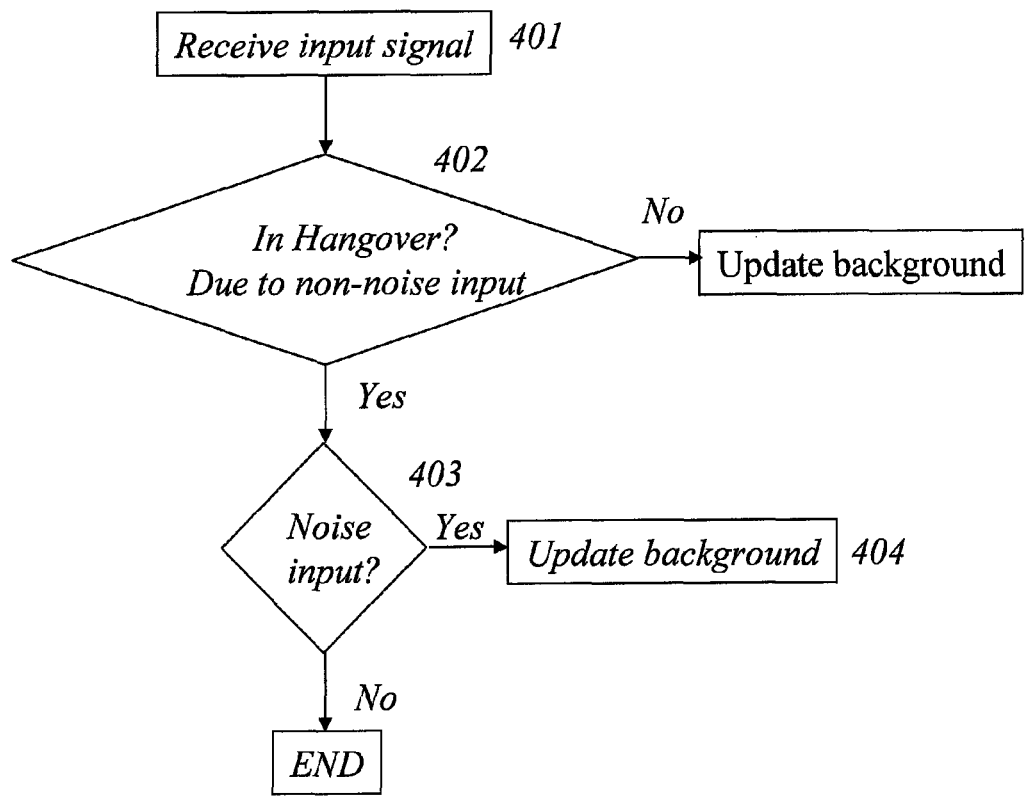
FIG. 4 is another flowchart illustrating a method according to embodiments of the present invention.
Figure 5:
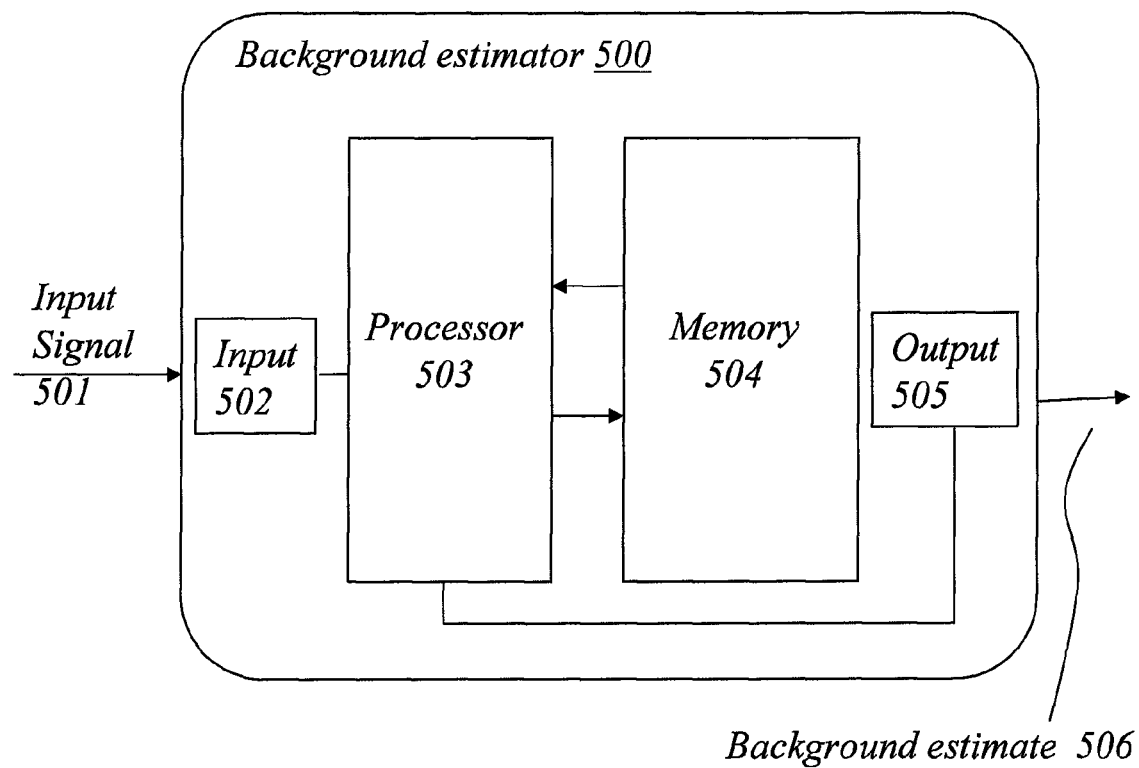
FIG. 5 illustrates schematically a background estimator according to embodiments of the present invention.

In the following, an embodiment of the present invention will be described in conjunction with FIG. 4. A method for updating a background noise estimate of an input signal in a background estimator of a VAD comprises receiving 401 the input signal for a current frame. It should be noted that the reception is shared between other blocks of the VAD and the background estimator can receive other input signals needed to perform the background estimate. Further, the method of the embodiment further comprises determining 402 whether the current frame of the input signal comprises non-noise or that one still is in background noise hangover from such frame(s) as in block 5 of FIG. 3. If it is determined that we are not in hangover, then the background estimate is updated. If it is determined that one is in hangover, then an additional determination whether the current frame input comprises noise is performed 403 by analyzing characteristics at least related to correlation and energy level of the input signal. The additional determination 403 corresponds to block 4a I FIG. 3. Then the background noise estimate is updated 404 if it is determined that the current frame comprises noise which corresponds to block 4b in FIG. 3.

The additional determination whether the current frame of the non-noise input comprises noise further comprises at least one of: detection of correlation and counting the number of frames from a frame last indicated a correlation event, if the energy level of the input signal is within in a first range from a smooth minimum energy level and if the total noise is within a second range from the smooth minimum energy level according to embodiments. Moreover, the detection of correlation and counting the number of frames from a frame last indicated a correlation event are performed to reduce the step size of the update of the background noise estimate and to determine when an update of the background noise estimate should be performed according to one embodiment.

According to one embodiment, the analysis of if the energy level of the input signal is within in a first range from the smooth minimum energy level is used to prevent from updating background noise estimate based on frames with high energy compared to the smooth minimum energy level and to determine when an update of the background noise estimate should be performed in block 4b of FIG. 3. Also according to an embodiment, the analysis of if the total noise is within a second range from the current estimated noise level is used to determine when an update of the background noise estimate should be performed in block 4b of FIG. 3.

The first and second ranges may be fixed ranges or adaptive ranges.

In a further embodiment, the additional determination performed in block 4a of FIG. 3 is applied to all frames not only to the frames that are considered to comprise background update hangover frames in block 5 of FIG. 3.

According to a further aspect of embodiments of the present invention a background estimator 500 in a VAD for updating a background noise estimate for an input signal 501 is provided. The background estimator 500 comprises an input section 502 configured to receive the input signal 501 for a current frame and other signals used for estimating the background noise. The background estimator 500 further comprises a processor 503, a memory 504 and an output section 505. The processor 503 is configured to determine whether the current frame of the input signal comprises non-noise, to perform an additional determination 4a whether the current frame of the non-noise input comprises noise by analyzing characteristics at least related to correlation and energy level of the input signal, and to update background noise estimate if it is determined that the current frame comprises noise. The memory 504 is configured to store software code portions for performing the functions of the processor 503 and background noise estimates and other data relating to noise and signal energy estimates.

Further, the additional determination 4a whether the current frame of the non-noise input comprises noise further may comprise at least one of: detection of correlation and counting the number of frames from a frame last indicated a correlation event, if the energy level of the input signal is within in a first range from a smooth minimum energy level and if the total noise is within a second range from the smooth minimum energy level.

In addition, the processor 503 may be configured to reduce the step size of the update of the background noise estimate and to determine when an update of the background noise estimate should be performed based on detection of correlation and the number of frames from a frame last indicated a correlation event.

According to one embodiment, the processor 503 is configured to use analysis of if the energy level of the input signal is within in a first range from the smooth minimum energy level to prevent from updating background noise estimate based on frames with high energy compared to the smooth minimum energy level and to determine when an update of the background noise estimate should be performed.

Moreover, the processor 503 may be configured to determine when an update of the background noise estimate should be performed based on analysis of if the total noise is within a second range from the current estimated noise level. The first and second ranges may be fixed or adaptive ranges.

In addition, the processor 503 is according to one embodiment configured to apply the additional determination on non-noise frames or frames in hangover.

It should also be noted that significance thresholds may be used to determine the energy levels of subbands of the input signal.

Figure 6:
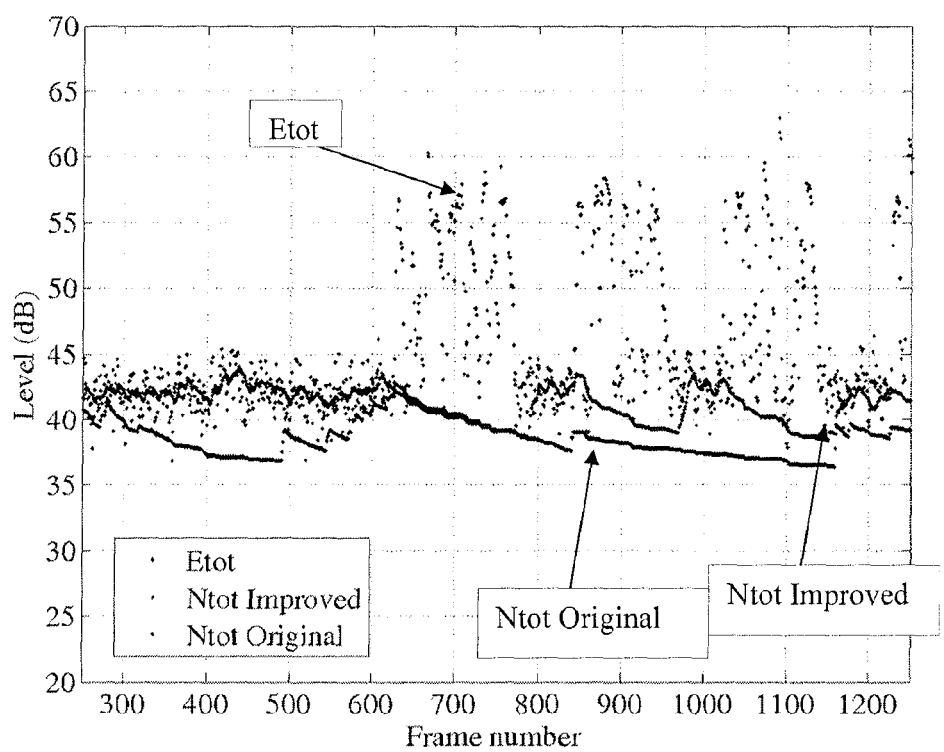
FIG. 6 illustrates improved noise tracking for mixed speech (−26 dBov) and noise babble 64 (−36 dBov) input according to embodiments of the present invention.

The following example shows the improvement in background noise tracking using the embodiment described in conjunction with the pseudo code. FIG. 6 shows the improvement for speech mixed with babble noise with 64 concurrent speakers with 10 dB SNR. FIG. 6 clearly shows that the improved decision logic allows for more updates in the speech pauses. Also for the initial segment with noise only the original decision logic is not able to track the input noise but instead shows a decreasing trend due to the always update downwards policy.

Figure 7:
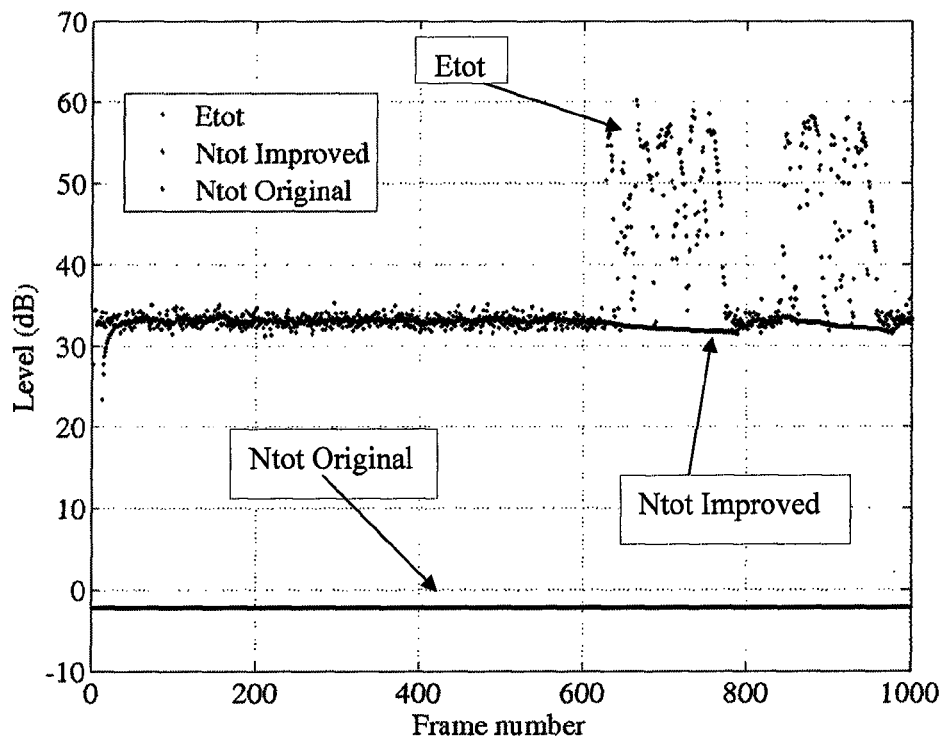
FIG. 7 illustrates improved noise tracking for mixed speech (−26 dBov) and pink noise (−46 dBov) input according to embodiments of the present invention.

FIG. 7 shows the improvement for speech mixed with pink noise input with 20 dB SNR. The figure clearly shows that the original solution does not even allow the noise tracking to start. For the improved logic there is only a small delay before the tracking starts and also here the tracking is allowed to work even in the speech pauses.

Modifications and other embodiments of the disclosed invention will come to mind to one skilled in the art having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A method for updating a background noise estimate for an input signal in a background estimator in a Voice Activity Detector, comprising:
   receiving the input signal for a current frame;
   determining whether the current frame of the input signal comprises non-noise;
   determining whether the current frame of the input signal comprises noise by analyzing characteristics related to at least one of a correlation and an energy level of the input signal, after determining that the current frame comprises non-noise; and
   updating the background noise estimate in response to determining that the current frame comprises noise,
   wherein determining whether the current frame of the input signal comprises noise further comprises at least one of:
   detecting correlation and counting a number of frames from a frame last indicating a correlation event, in response to determining that a first difference between an energy level of the input signal and a smooth minimum energy level is within a first range and that a second difference between a noise level of the current frame and the smooth minimum energy level is within a second range.

2. The method according to claim 1, wherein detecting correlation and counting the number of frames from a frame last indicating a correlation event are performed to reduce a step size of the update of the background noise estimate and to determine when an update of the background noise estimate should be performed.

3. The method according to claim 1, wherein the determination of whether the first difference is within the first range is used to prevent from updating the background noise estimate based on frames with high energy compared to the smooth minimum energy level and to determine when an update of the background noise estimate should be performed.

4. The method according to claim 1, wherein the determination of whether the second difference is within the second range is used to determine when an update of the background noise estimate should be performed.

5. The method according to claim 1, wherein the first and second ranges are fixed ranges.

6. The method according to claim 1, wherein the first and second ranges are adaptive ranges.

7. The method according to claim 1, wherein determining whether the current frame of the input signal comprises noise applies to all frames.

8. The method according to claim 1, wherein determining whether the current frame of the input signal comprises noise applies to frames of non-noise frames or frames in hangover.

9. The method according to claim 1, wherein determining whether the current frame of the input signal comprises noise comprises:
   determining whether the current frame of the input signal comprises noise, in response to determining, after determining that the current frame comprises non-noise, that a hangover is occurring.

10. The method according to claim 1,
    wherein determining whether the current frame of the input signal comprises non-noise comprises:
       determining, in a first determination, whether the current frame of the input signal likely comprises voice,
    wherein determining whether the current frame of the input signal comprises noise after determining that the current frame comprises non-noise comprises:
       determining, in a second determination, whether the current frame of the input signal comprises noise by analyzing the characteristics related to the at least one of the correlation and the energy level of the input signal, after determining in the first determination that the current frame likely comprises voice, and
    wherein the current frame of the first and second determinations comprises the same frame.

11. A background estimator in a Voice Activity Detector for updating a background noise estimate for an input signal, the background estimator comprising:
    an input section configured to receive the input signal for a current frame, and
    a processor configured to:
       determine whether the current frame of the input signal comprises non-noise;
       determine whether the current frame of the input signal comprises noise by analyzing characteristics related to at least one of a correlation and an energy level of the input signal, after determining that the current frame comprises non-noise; and
       update the background noise estimate in response to determining that the current frame comprises noise,
       wherein determining whether the current frame of the input signal comprises noise further comprises at least one of: detecting correlation and counting a number of frames from a frame last indicating a correlation event in response to determining that a first difference between an energy level of the input signal and a smooth minimum energy level is within a first range and that a second difference between a noise level of the current frame and the smooth minimum energy level is within a second range.

12. The background estimator according to claim 11, wherein the processor is configured to reduce a step size of the update of the background noise estimate and to determine when an update of the background noise estimate should be performed based on detecting correlation and counting the number of frames from a frame last indicating a correlation event.

13. The background estimator according to claim 11, wherein the processor is configured to use the determination of whether the first difference is within the first range to prevent from updating the background noise estimate based on frames with high energy compared to the smooth minimum energy level and to determine when an update of the background noise estimate should be performed.

14. The background estimator according to claim 11, wherein the processor is configured to determine when an update of the background noise estimate should be performed based on the determination of whether the second difference is within the second range.

15. The background estimator according to claim 11, wherein the first and second ranges are fixed ranges.

16. The background estimator according to claim 11, wherein the first and second ranges are adaptive ranges.

17. The background estimator according to claim 11, wherein the processor is configured to perform the determination of whether the current frame of the input signal comprises noise on all frames.

18. The background estimator according to claim 11, wherein the processor is configured to perform the determination of whether the current frame of the input signal comprises noise on non-noise frames or frames in hangover.

19. The background estimator according to claim 11, wherein the processor is configured to perform the determination of whether the current frame of the input signal comprises noise, in response to determining, after determining that the current frame comprises non-noise, that a hangover is occurring.

20. The background estimator according to claim 11,
wherein the processor is configured to determine whether the current frame of the input signal comprises non-noise by:
determining, in a first determination, whether the current frame of the input signal likely comprises voice,
wherein the processor is configured to determine whether the current frame of the input signal comprises noise after determining that the current frame comprises non-noise by:
determining, in a second determination, whether the current frame of the input signal comprises noise by analyzing the characteristics related to the at least one of the correlation and the energy level of the input signal, after determining in the first determination that the current frame likely comprises voice, and
wherein the current frame of the first and second determinations comprises the same frame.

* * * * *

UNITED STATES PATENT AND TRADEMARK OFFICE
CERTIFICATE OF CORRECTION

PATENT NO.       : 9,202,476 B2                    Page 1 of 1
APPLICATION NO.  : 13/502962
DATED            : December 1, 2015
INVENTOR(S)      : Sehlstedt It is certified that error appears in the above-identified patent and that said Letters Patent is hereby corrected as shown below:

In the Specification

In Column 2, Line 24, delete "dash-doted" and insert -- dash-dotted --, therefor.

In Column 6, Line 24, delete "some times" and insert -- sometimes --, therefor.

In Column 9, Line 45, delete "background)" and insert -- background). --, therefor.

Signed and Sealed this
Sixteenth Day of August, 2016

Michelle K. Lee
*Director of the United States Patent and Trademark Office*